United States Patent
Ohmiya

(10) Patent No.: US 7,528,853 B2
(45) Date of Patent: May 5, 2009

(54) COLOR IMAGE FORMING APPARATUS AND PROCESS CARTRIDGE

(75) Inventor: Satoshi Ohmiya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 93 days.

(21) Appl. No.: 11/182,763

(22) Filed: Jul. 18, 2005

(65) Prior Publication Data

US 2006/0023231 A1    Feb. 2, 2006

(30) Foreign Application Priority Data

Jul. 29, 2004    (JP)    ............................ 2004-221298

(51) Int. Cl.
*B41J 2/435*    (2006.01)
*B41J 2/47*    (2006.01)

(52) U.S. Cl. ...................... 347/235; 347/250

(58) Field of Classification Search ......... 347/234–235, 347/116, 229, 248–250; 250/548
See application file for complete search history.

(56) References Cited

U.S. PATENT DOCUMENTS

| | | | |
|---|---|---|---|
| 4,600,841 A * | 7/1986 | Tokuno et al. | 250/548 |
| 5,099,260 A * | 3/1992 | Sato et al. | 347/116 |
| 5,414,522 A | 5/1995 | Moriya | |
| 5,500,725 A | 3/1996 | Takasu et al. | |
| 5,515,145 A * | 5/1996 | Sasaki et al. | 399/302 |
| 5,778,276 A | 7/1998 | Hasegawa | |
| 5,973,797 A | 10/1999 | Tanaka et al. | |
| 6,266,512 B1 | 7/2001 | De Koning et al. | |
| 6,916,131 B2 * | 7/2005 | Nakasendo | 400/342 |
| 7,145,823 B2 * | 12/2006 | Jain et al. | 365/211 |
| 2001/0017645 A1 * | 8/2001 | Toda | 347/116 |
| 2002/0024580 A1 * | 2/2002 | Kobayashi et al. | 347/116 |
| 2002/0063771 A1 * | 5/2002 | Nozaki et al. | 347/235 |
| 2002/0110389 A1 | 8/2002 | Ozawa | |
| 2003/0112317 A1 * | 6/2003 | Murakami | 347/116 |
| 2004/0100667 A1 | 5/2004 | Oyama et al. | |
| 2006/0023231 A1 | 2/2006 | Ohmiya | |

FOREIGN PATENT DOCUMENTS

| | | |
|---|---|---|
| JP | 2003-255656 | 9/2003 |
| JP | 2004-96157 | 3/2004 |

OTHER PUBLICATIONS

U.S. Appl. No. 11/567,493, filed Dec. 06, 2006, Ohmiya.

* cited by examiner

*Primary Examiner*—Hai C Pham
(74) *Attorney, Agent, or Firm*—Oblon, Spivak, McClelland, Maier & Neustadt, P.C.

(57) ABSTRACT

A color image forming apparatus in which an engine controller outputs an operation start signal to write controllers at a timing at which a registration sensor detects a position of a sheet of transfer paper. Synchronization detection signals for colors are used to set reference positions for front edges of the colors in a main scanning direction. A write controller for a reference color outputs a write-operation start signal so as not to cut the synchronization detection signals each indicating one line for one color in the main scanning direction and line synchronization signals, into two parts in their longitudinal direction. The write-operation start signal is used to set a reference time point when the write controllers make transfer requests for image signals for the colors to an image processor.

7 Claims, 9 Drawing Sheets

COLOR IMAGE FORMING APPARATUS AND PROCESS CARTRIDGE

CROSS-REFERENCE TO RELATED APPLICATIONS

The present document incorporates by reference the entire contents of Japanese priority document, 2004-221298 filed in Japan on Jul. 29, 2004.

BACKGROUND OF THE INVENTION

1. Field of the Invention

The present invention relates to a color image forming apparatus that electrophotographically forms a color image, and a process cartridge for the color image forming apparatus.

2. Description of the Related Art

Tandem-type color image forming apparatuses have units each of which adjusts a timing of starting image formation for each color. Japanese Patent Application Laid-Open No. 2003-255656 discloses a technology for a tandem-type color image forming apparatus that has delay adjustment functions each of which is discretely provided for one of the colors in color images and controls a timing of starting image formation.

An image forming apparatus is a device that forms an electrostatic image as an output to a transfer paper that is a recording medium. Functions required for the image forming apparatus are high resolution, high speed, and high density. The high resolution and the high speed are also required for monochrome image forming apparatuses. However, recently available color image forming apparatuses require higher resolution than ever before. The monochrome image forming apparatus forms a monochrome image on a specified position of a transfer paper. However, the color image forming apparatus needs to form images of a plurality of colors, four colors in general (black, magenta, cyan, and yellow) on a specified position of a transfer paper. Therefore, misregistrations between the images lead to color shifts, causing a degradation of the image.

As an electrophotographic image forming apparatus, a system for generating an operation start signal is known. The system generates the operation start signal based on a detection signal by a registration sensor that detects a position of a transfer paper. In this case, a registration position in a sub-scanning direction is adjusted during a time from generating the operation start signal to starting image formation of the colors. More specifically, such a tandem-type color image forming apparatus as follows is known. The tandem-type color image forming apparatus includes image forming units arranged along a transfer belt called an intermediate transfer belt. Each of the image forming units is provided for each color and includes a photosensitive element. The image forming units form the images of the colors, and the images formed are superposedly on the same position of the intermediate transfer belt. The images superposed are transferred to the transfer paper by a transfer unit.

In such a tandem-type color image forming apparatus, timings of starting image formation for the colors differ from one another. This is because it is necessary to superpose the images of the colors from the image forming units for the colors on one another on the same position of the intermediate transfer belt. Therefore, distances from the registration sensor to respective positions of image formation for the colors are different from one another. This type of color image forming apparatus therefore includes units, each of which adjusts timing for one of the colors until relevant image formation is started. For example, Japanese Patent Application Laid-Open No. 2003-255656 discloses the technology in which the tandem-type color image forming apparatus has the delay adjustment functions provided discretely for each of the colors of a color image and controls each timing of starting image formation.

It is also necessary to control registration between the colors in the sub-scanning direction (hereinafter, "sub-scanning registration") according to each color registration. Therefore, generally, the registration is controlled based on a synchronization detection signal that is a reference timing signal for starting to write for each color in a main scanning direction.

However, the synchronization detection signals for the colors are detected at different timings in each color because the positions of image heights are different. Furthermore, the operation start signal generated based on the detection by the registration sensor is an asynchronous signal with respect to the synchronization detection signal for each color. Therefore, displacement for a line period occurs between image formations for the colors according to the operation start signal and the timing of the synchronization detection signal for each color, which results in occurrence of color shift for each color on the registration position in the sub-scanning direction, which causes occurrence of the color shift by one line period at maximum.

The technology disclosed in Japanese Patent Application Laid-Open No. 2003-255656 describes that the tandem-type color image forming apparatus based on an one-beam optical system for each color compares phases of the operation start signal and the synchronization detection signal for each color with a line period, adjusts an imaging timing in the sub-scanning direction for each color one line by one line, and prevents displacement between registration positions by one line in the sub-scanning direction.

In the above technology, however, it is necessary to provide a unit (measuring unit) for measuring an elapsed time and a unit (operating unit) for obtaining a predetermined difference. Therefore, it is desired to suppress displacement between pixels in the sub-scanning direction without using these units.

In the above technology, comparison and operation are performed based on a cycle T of the synchronization detection signal, but the cycle of the synchronization detection signal fluctuates depending on rotational speed variations or mirror surface precision of a rotating polygon mirror. In such a case, if the timing of an input of the operation start signal is synchronized to the synchronization detection signal, it is disadvantage that a determining unit causes timings of starting image formation of write controllers to be different so that each of the write controllers differently controls optical writing to form an electrostatic latent image. By causing reference time points of all the write controllers to be a single point based on only timings of inputting the synchronization detection signal of the write controller and of inputting the operation start signal, it is desired to prevent occurrence of nonuniform control in the write controllers.

Furthermore, the timings of starting image formation are made to be delayed line by line by a writing unit. When the write controller makes an image signal delayed line by line, it is necessary to provide a storage device (memory or so) capable of temporarily storing image data for one line. By causing a timing of making a transmission request for an image signal to be delayed but not by causing an image signal to be delayed in the write controller, the need for the storage device is eliminated, which makes it possible to reduce manufacturing costs of the color image forming apparatus.

SUMMARY OF THE INVENTION

It is an object of the present invention to at least solve the problems in the conventional technology.

A color image forming apparatus according to one aspect of the present invention, which forms a color image by superposing a plurality of toner images formed by a plurality of printer engines corresponding to respective colors, includes a plurality of light sources each of which emits light as image data to optically write an electrostatic latent image of a respective color on a photosensitive element provided in each of the printer engines; a rotating polygon mirror that reflects the light from each of the light sources while rotating to expose and scan the photosensitive element; a plurality of light receiving elements that receives the light reflected by the rotating polygon mirror and outputs a synchronization detection signal that becomes a reference for a start position of an optical writing in a main scanning direction with respect to the photosensitive element; and a plurality of write controllers that makes a transfer request for the image data from each of the light sources to control the optical writing performed by each of the light sources. Each of the write controllers performs the transfer request for the image data based on a time, as a reference time, at which the synchronization detection signals for whole colors in same main-scanning lines are included in either of a forward direction and a backward direction, when an operation start signal that is asynchronous with the synchronization detection signal and becomes a start point of an imaging operation is input.

A process cartridge according to another aspect of the present invention, which is for a tandem-type color image forming apparatus that forms a color image by superposing a plurality of toner images formed by a plurality of printer engines corresponding to respective colors, includes at least a photosensitive element for each of the printer engines; and a storage device that stores a timing from a predetermined reference time at which a plurality of write controllers makes a transfer request for image data from a plurality of light sources for optically writing an electrostatic latent image of a respective color on a photosensitive element provided in each of the printer engines.

A process cartridge according to still another aspect of the present invention, which is for a tandem-type color image forming apparatus that forms a color image by superposing a plurality of toner images formed by a plurality of printer engines corresponding to respective colors, includes at least a photosensitive element for each of the printer engines; and a storage device that stores a value for calculating a timing from a predetermined reference time at which a plurality of write controllers makes a transfer request for image data from a plurality of light sources for optically writing an electrostatic latent image of a respective color on a photosensitive element provided in each of the printer engines.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a color image forming apparatus and a process cartridge according to the present invention are explained in detail below with reference to the accompanying drawings.

Figure 1:
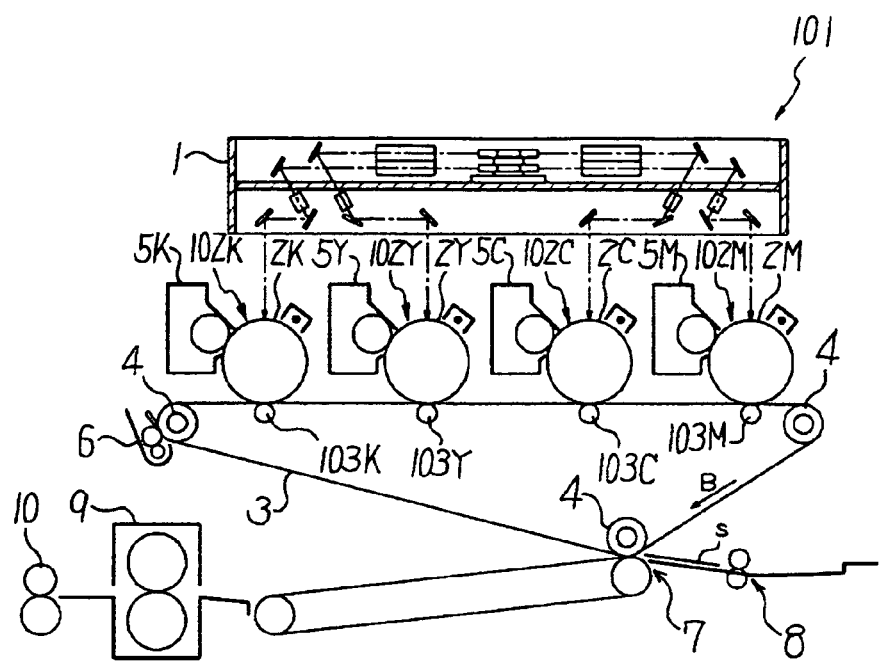
FIG. 1 is a schematic of a color image forming apparatus according to an embodiment of the present invention.
Figure 2:
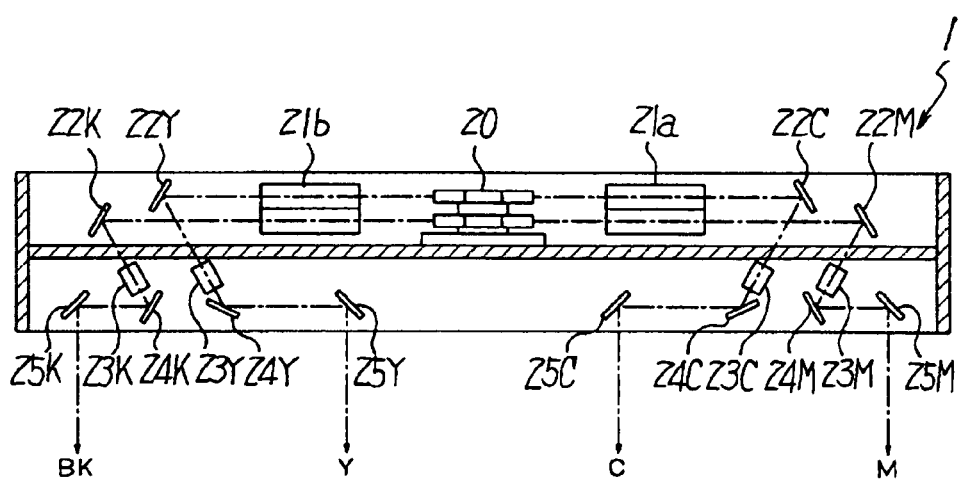
FIG. 2 is a schematic of an optical writing unit for the color image forming apparatus.
Figure 3:
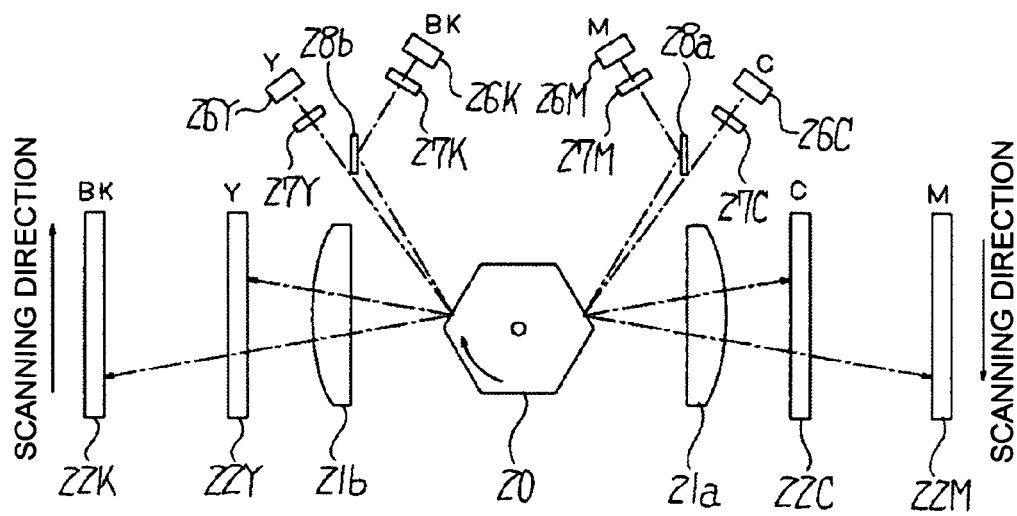
FIGS. 3 and 4 are plan views of the optical writing unit.
Figure 4:
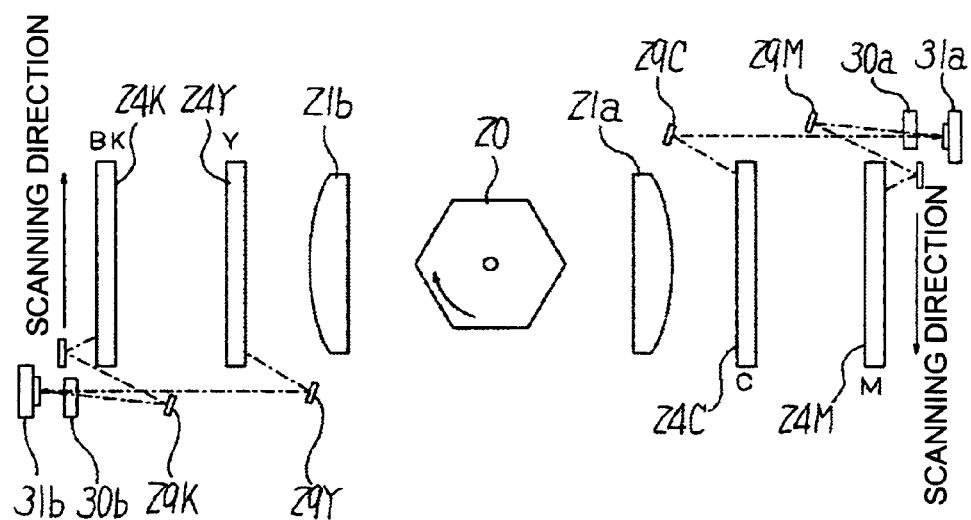
Figure 5:
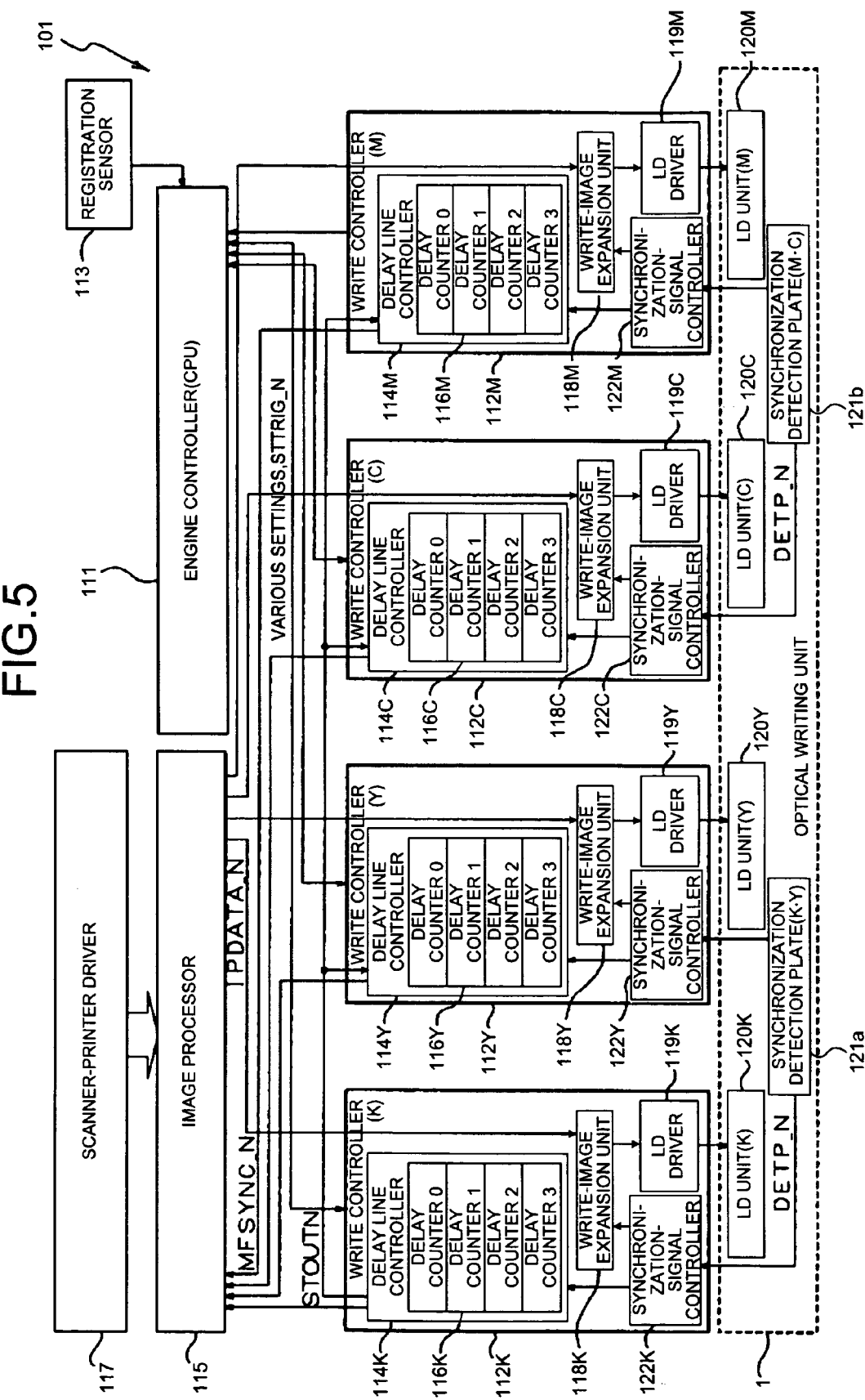
FIG. 5 is a block diagram of a control system for the color image forming apparatus.

FIG. 1 is a schematic of a color image forming apparatus according to an embodiment of the present invention, FIG. 2 is a schematic of an optical writing unit for the color image forming apparatus, FIGS. 3 and 4 are plan views of the optical writing unit, and FIG. 5 is a control block diagram of the color image forming apparatus.

As shown in FIG. 1, a color image forming apparatus 101 according to the present embodiment is a tandem type. More specifically, the color image forming apparatus 101 includes four printer engines 102K, 102Y, 102C, and 102M (hereinafter, "102K to 102M") that are arranged in a row. The printer engines 102K to 102M form images of a plurality of colors, in this case, black (K), yellow (Y), cyan (C), and magenta (M), respectively using an electrophotographic method. The printer engines 102K to 102M include known components used for an electrophotographic process, such as photosensitive drums 2K, 2Y, 2C, and 2M (hereinafter, "2K to 2M") and developing devices 5K, 5Y, 5C, and 5M (hereinafter, "5K to 5M") which are arranged around the photosensitive drums 2K to 2M, respectively. Toner images of the colors are formed on the photosensitive drums 2K to 2M respectively, and the toner images formed are superposedly transferred, by transfer devices 103K, 103Y, 103C, and 103M, to an intermediate transfer belt 3 that is an image carrier driven by intermediate transfer rollers 4. The color image forming apparatus 101 also includes an intermediate-transfer-belt cleaning device 6, a transfer device 7, registration rollers 8, a fixing device 9, and a paper discharge device 10.

A start switch (not shown) is operated or a print-job start signal is made active from a host device such as a personal computer (PC) (not shown). Then, laser beams of which emission timings are controlled are emitted from an optical writing unit 1, and the laser beams emitted expose the photosensitive drums 2K to 2M to form electrostatic latent images thereon, respectively. The respective photosensitive drums 2K to 2M corresponding to the developing devices 5K to 5M of the colors are made to rotate, and single-color images of black, yellow, cyan, and magenta are formed on positions exposed with the laser beams of the photosensitive drums 2K to 2M, respectively. The intermediate transfer belt 3 is made to rotate concurrently with the operations. More specifically, the intermediate transfer belt 3 is conveyed in a direction B by rotating one of the three intermediate transfer rollers 4 as a drive roller and the other two as driven rollers of FIG. 1. Developing operations on the photosensitive drums 2K to 2M and conveying operation of the intermediate transfer belt 3 allow the single-color images respectively formed on the photosensitive drums 2K to 2M to be successively transferred to the intermediate transfer belt 3, and to form a composite color image in which the toner images of the colors are superposed on one another on the intermediate transfer belt 3.

On the other hand, by making the job start signal active, transfer paper is separated one by one and sent out from a paper feed device (not shown), and conveyed to the registration rollers 8. At this time, the transfer paper is made to abut against the registration rollers 8, and is stopped once. The registration rollers 8 are made to rotate in synchronization with the composite color image on the intermediate transfer belt 3, and a sheet s of transfer paper that is a printing medium is fed to between the intermediate transfer belt 3 and the transfer device 7. Then, the composite color image is transferred to the sheet s by the transfer device 7. The sheet s with the composite color image thereon is conveyed as it is to the fixing device 9, where it is fixed by being applied with heat and pressure. The sheet s with the image fixed thereon is discharged by paper discharge rollers attached to the paper discharge device 10, and is stacked on a paper discharge tray (not shown).

As shown in FIG. 2, the optical writing unit 1 includes a polygon mirror 20 that is a rotating polygon mirror, fθ lenses 21a and 21b, first mirrors 22K, 22Y, 22C, and 22M (hereinafter, "22K to 22M"), long toroidal (WTL) lenses 23K, 23Y, 23C, and 23M, second mirrors 24K, 24Y, 24C, and 24M (hereinafter, "24K to 24M"), and third mirrors 25K, 25Y, 25C, and 25M (hereinafter, "25K to 25M"). The optical writing unit 1 of the color image forming apparatus 101 forms electrostatic latent images of four colors of K, Y, C, and M. A dominant type of the conventional image forming apparatuses is a type of forming electrostatic latent images of four colors by four optical writing units that are independently provided. However, in the embodiment of the present invention, the optical writing unit 1 as a single unit forms the electrostatic latent images of the four colors.

In the optical writing unit 1, laser diodes are mounted on laser units 26Y, 26K, 26M and 26C (hereinafter, "26Y to 26C") (see FIG. 3 and FIG. 4) corresponding to respective images of the colors, and laser beams emitted from the laser diodes enter cylindrical lenses (not shown). The cylindrical lens has an index of refraction fixed in the sub-scanning direction and collects the laser beams emitted from the laser units in the sub-scanning direction to make them enter a mirror surface of the polygon mirror 20 that is the rotating polygon mirror. The polygon mirror 20 is made to rotate in a high speed by a polygon motor (not shown) and polarizes the incident laser beams in the main scanning direction. The optical writing unit 1 has the polygon mirror 20 as a single unit arranged at the center thereof, and causes the polygon mirror 20 to polarize the laser beams of the four colors in the main scanning direction. The components such as the laser units, the mirrors, and the lenses are symmetrically arranged with respect to the polygon mirror 20. By providing light paths for two-color laser beams in each of both sides of the polygon mirror 20, it is realized to polarize the four color laser beams by the polygon mirror 20 as a single unit. As shown in FIG. 3, the light paths for black and yellow are arranged on the left side of the polygon mirror 20 and the light paths for cyan and magenta are arranged on the right side thereof. The laser beams polarized by the polygon mirror 20 are reflected by the first mirrors 22K to 22M, respectively.

As shown in FIG. 3 and FIG. 4, the optical writing unit 1 further includes the laser units 26Y to 26C having the laser diodes, cylindrical lenses 27Y, 27K, 27M, and 27C, reflective mirrors 28a and 28b, synchronization-detection reflective mirrors 29K, 29Y, 29C, and 29M (hereinafter, "29K to 29M"), synchronization detection lenses 30a and 30b, and synchronization detection sensors 31a and 31b. The laser beams reflected by the first mirrors 22K to 22M enter the WTL lenses 23K to 23M, and then enter the second mirrors 24K to 24M, respectively. Each of the WTL lenses 23K to 23M corrects plane tilt characteristics of the polygon mirror 20. The laser beams reflected by the second mirrors 24K to 24M are reflected by the third mirrors 25K to 25M, and output from the optical writing unit 1 to form images on the photosensitive drums 2K to 2M, respectively.

The optical writing unit 1 has the optical components arranged symmetrically with respect to the polygon mirror 20, and pairs of the optical paths for two colors are formed on both sides thereof. The synchronization detection sensors 31a and 31b output a synchronization detection signal (DETP_N) (explained later) indicating a reference position for starting optical writing in the main scanning direction. More specifically, the laser beams are reflected by respective specific positions in the main scanning direction of the second mirrors 24K to 24M, and the laser beams reflected are further reflected by the synchronization-detection reflective mirrors 29K to 29M toward the synchronization detection lenses 30a and 30b, respectively. The laser beams thus reflected enter the respective synchronization detection sensors 31a and 31b, and the synchronization detection sensors 31a and 31b output detection signals as the synchronization detection signals (DETP_N). The synchronization detection lenses 30a and 30b are arranged to converge the incident laser beams to the synchronization detection sensors 31a and 31b, respectively. One of the synchronization detection sensors 31a and 31b is arranged on one side thereof, and therefore, one sensor detects timings of the two-color laser beams. In other words, the synchronization detection sensor 31a detects main-scanning reference positions of cyan and magenta, and the synchronization detection sensor 31b detects main-scanning reference positions of black and yellow.

An engine controller 111 controls the whole of the color image forming apparatus 101, and sets each operation mode for controllers. More specifically, the optical writing unit 1 perform various settings for write controllers 112K, 112Y, 112C, and 112M (hereinafter, "112K to 112M") each of which controls optical writing for an image of one color, and sets a color out of the four colors of K, Y, C, and M as a reference. The color K is set as the reference color of FIG. 5 because image formation is started with K based on the arrangement of FIG. 1. A registration sensor 113 detects a position of the sheet s that abuts against the registration rollers 8 on the conveying path of the sheet s. The engine controller 111 outputs a reference-operation start signal (STTRIG_N) to the write controllers 112K to 112M at the timing of detecting the position of the sheet s by the registration sensor 113. Each of the write controllers 112K to 112M corresponding to the colors determines whether the color handled by a relevant write controller is set as the reference color or a subordinate color. If it is the reference color, the relevant write controller latches STTRIG_N and outputs a write-operation start signal (STOUT_N) at a predetermined timing that is controlled by line. In this example, K is set as the reference color, so the write controller 112K latches STTRIG_N, and outputs STOUT_N to the other write controllers for the three colors.

The write controllers 112K to 112M control optical writing to form the electrostatic latent images of the colors. In the write controllers 112K to 112M, delay line controllers 114K, 114Y, 114C and 114M (hereinafter, "114K to 114M") control the number of delay lines using STOUT_N as a reference.

More specifically, the delay line controllers 114K to 114M previously detect respective positions in the sub-scanning direction where each of the images of the colors is transferred to the intermediate transfer belt 3, and calculate delay timings of starting image formation with Y, C, and M from the reference color K. A delay time for conveyance of the sheet s is added to each of the results of calculation. The delay time is calculated from a positional relation between the registration sensor 113 that detects a position of the sheet s and the transfer position of the reference color K. The delay time as a result of addition is substituted in the number of lines in the sub-scanning direction, and the number of lines obtained is set as the number of delay lines. The engine controller 111 sets respective pieces of information such that each delay time for image formation for the colors is substituted in the number of delay lines, in delay counters 116K, 116Y, 116C, and 116M (hereinafter, "116K to 116M") in the write controllers 112K to 112M, respectively. Each of the write controllers 112Y to 112K outputs a request signal (MFSYNC_N) indicating a transfer request for image data, to an image processor 115 provided in the upstream side of the write controllers 112K to 112M, at the timing controlled by each of the delay line controllers 114K to 114M.

More specifically, each of the delay counters 116K to 116M includes delay counters zero to three (explained later) that adjust a delay amount in the sub-scanning direction from the timing of generating the signal STOUT_N. The image processor 115 accumulates image data subjected to various types of image processing based on image data expanded sent from a scanner-printer driver 117 provided in the upstream side of the image processor 115. It is noted that the scanner-printer driver 117 indicates a scanner when the color image forming apparatus 101 is a digital copying machine or indicates a printer driver when it is a printer. The image processor 115 outputs the image data accumulated as image signals (IPDATA_N) to the write controllers 112K to 112M based on the MFSYNC_N input from the write controllers 112K to 112M, respectively. Write-image expansion units 118K, 118Y, 118C, and 118M in the write controllers 112K to 112M expand the image signals (IPDATA_N) into each main-scanning and sub-scanning two-dimensional image, and supply the two-dimensional images expanded to laser diode (LD) drivers 119K, 119Y, 119C, and 119M (hereinafter, "119K to 119M"), respectively. The LD drivers 119K to 119M drive laser diodes that are light sources mounted on respective LD units 120K, 120Y, 120C, and 120M based on the two-dimensional image signals input, modulate laser beams for optically writing to form the electrostatic latent images of the colors, and emit the laser beams modulated, respectively.

Synchronization detection plate 121a includes the synchronization detection sensor 31a, and synchronization detection plate 121b includes the synchronization detection sensor 31b. The synchronization detection sensors 31a and 31b serve as light receiving elements, and the synchronization detection signals (DETP_N) detected by the synchronization detection sensors 31a and 31b are output to synchronization-signal controllers 122K, 122Y, 122C, and 122M, respectively.

Figure 6:
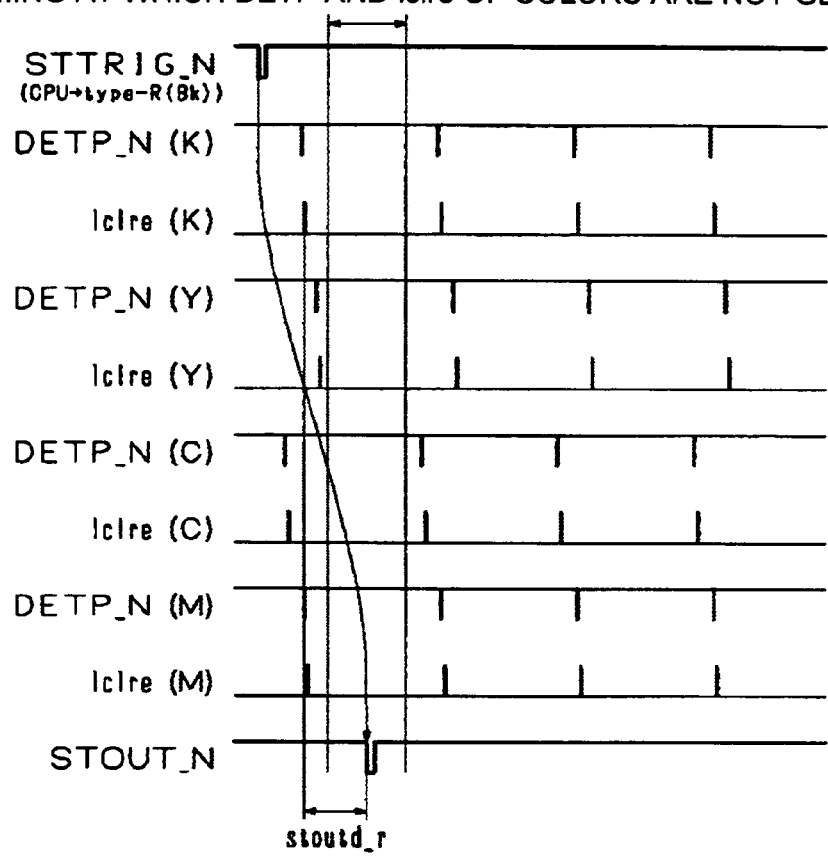
FIGS. 6 and 7 are timing charts of job start control in the color image forming apparatus.
Figure 7:
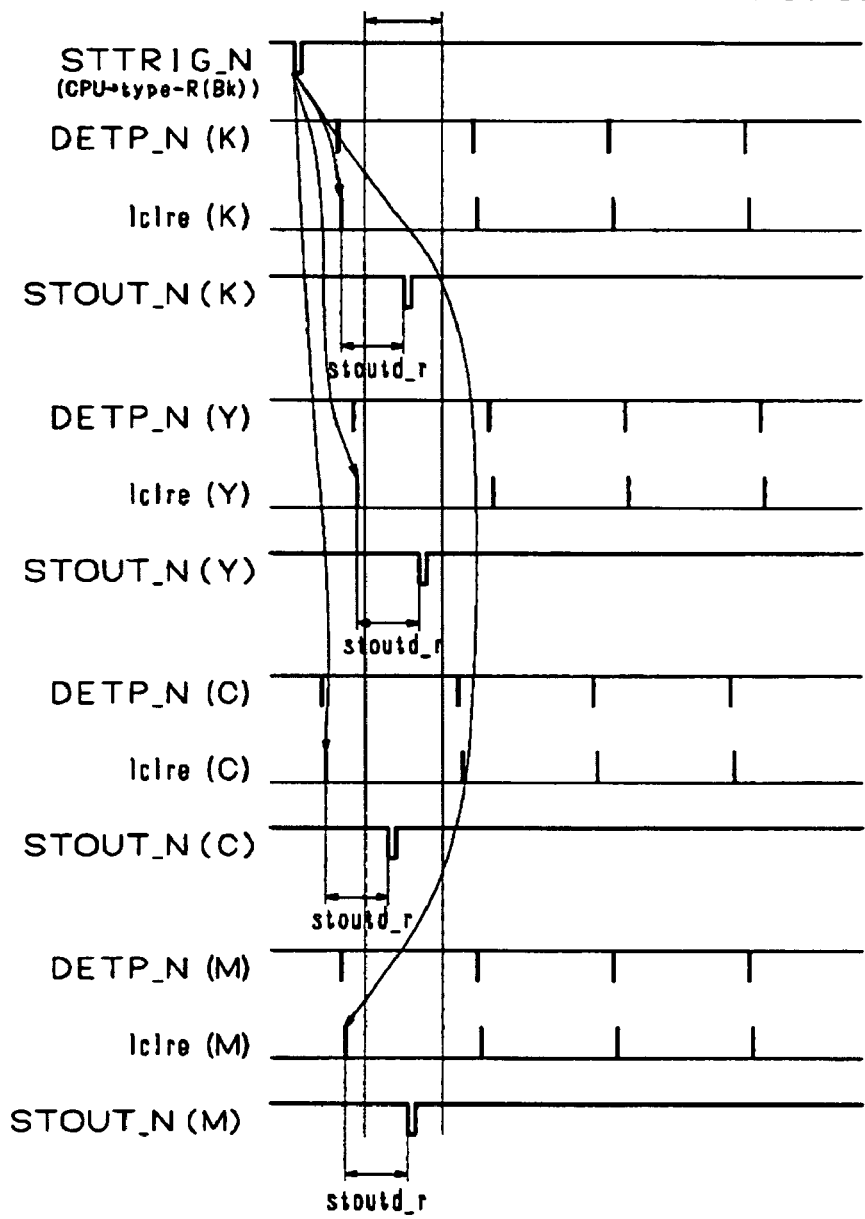

FIGS. 6 and 7 are timing charts of job start control in the color image forming apparatus 101. The operation start signal (STTRIG_N) is output from the engine controller 111 to the write controllers 112K to 112M at the timing of detecting the position of the sheet s by the registration sensor 113. Timings of the synchronization detection signals (DETP_N) for the colors are slightly displaced from one another because each front edge of the synchronization detection signals for the colors in the main scanning direction is set as a reference position. The write controller 112K for the reference color K outputs the write-operation start signal (STOUT_N) at a timing of not generating the respective synchronization detection signals (DETP_N) for the whole colors and the line synchronization signals (lclre), i.e. not a timing of longitudinally cutting the synchronization detection signals (DETP_N) for the respective one lines for the colors in the main scanning direction and the corresponding line synchronization signals (lclre), into two parts. More specifically, the write controller 112K for the reference color K outputs the write-operation start signal (STOUT_N) after the synchronization detection signals (DETP_N) each for one line for one of the colors in the main scanning direction and the corresponding line synchronization signals (lclre) are generated and before the next synchronization detection signals (DETP_N) each for the next one line for the color in the main scanning direction and the corresponding line synchronization signals (lclre) are generated. The write-operation start signal (STOUT_N) is provided as a reference time point at which the write controllers 112K to 112M make respective transfer requests for image signals for the colors to the image processor 115.

The line synchronization signal (lclre) is a signal for synchronizing the input of the synchronization detection signal (DETP_N) to a control clock of each of the write controllers 112K to 112M, and each of the write controllers 112K to 112M controls writing in synchronization with the control clock. The synchronization detection signals (DETP_N) are separately described in FIG. 6 for each of the colors of K, Y, C, and M. However, the synchronization detection sensor 31a is shared by K and Y or C and M, and the synchronization detection sensor 31b is also shared by K and Y or C and M, and therefore, the synchronization detection signals (DETP_N) are input in combination of K and Y and in combination of C and M. These DETP_N signals input are separated into those of the respective colors in the write controllers 112K to 112M. Each of the DETP_N signals obtained through separation and in synchronization with the control clock is provided as a line synchronization signal (lclre).

If the delay line controllers 114K to 114M are made to operate based on the operation start signal (STTRIG_N) without generating the write-operation start signal (STOUT_N), sub-scanning timings are caused to be asynchronous among the colors because an input timing of STTRIG_N is asynchronous with the line synchronization signals (lclre) that are reference signals for the write controllers 112K to 112M, which causes displacement to occur in the sub-scanning registration, resulting in fault such as a color shift.

In this embodiment, therefore, the delay line controllers 114K to 114M are made to operate by the write-operation start signal (STOUT_N) in synchronization with the operations of the write controllers 112K to 112M, separately from the operation start signal (STTRIG_N). The write-operation start signal (STOUT_N) is generated at a timing at which a fixed time (stoutd_r) is elapsed since a line synchronization signal for K (lclre(k)) that is a reference color for image formation is detected after STTRIG_N that is an asynchronous signal is input to the write controllers 112K to 112M. The value of "stoutd_r" indicates a timing at which the synchronization detection signals (DETP_N) for the write controllers 112K to 112M for the whole colors and the corresponding line synchronization signals (lclre) are not generated with respect to the line period of the reference color K. That is, the value of stoutd_r indicates not a timing at which the synchronization detection signals (DETP_N) each for one line for one of the colors in the main scanning direction and the corresponding line synchronization signals (lclre) are longitudinally cut into two parts. More specifically, the value of stoutd_r indicates that the write-operation start signal (STOUT_N) is output after the synchronization detection signals (DETP_N) and the corresponding line synchronization signals (lclre) are generated and before the next synchronization detection signals (DETP_N) each for the next line in main scanning direction and the corresponding line synchronization signals (lclre) are generated.

The write controllers 112K to 112M for the colors start adjustment of a sub-scanning timing based on the timing of STOUT_N as a reference. Therefore, it is possible to start adjustment of the sub-scanning registration between the colors at a timing in the same line periods that do not include next line periods, and to manage timings for color registration in the sub-scanning direction.

In an example shown in FIG. 7, the write controllers 112K to 112M perform the job start control. The operation of generating STOUT_N at a timing, at which the fixed time (stoutd_r) is elapsed from the timing of inputting STTRIG_N after lclre is first detected, is the same as explained above, but in this example, the write controllers 112K to 112M generate STOUT_N respectively. In other words, a plurality of STOUT_N is generated in the write controllers 112K to 112M, and a reference time is provided in each of the write controllers 112K to 112M. In this case, the concept of the reference color for image formation explained above is not applied but the whole colors are operated as reference colors. Since the timings of lclre (K) to (M) are different from one another, the timings of STOUT_N (K) to (M) are also different from one another. However, by setting the value of stoutd_r to timings of not generating DETP_N and lclre in the write controllers 112K to 112M for the whole colors, there is no chance to generate STOUT_N (K) to (M) at a timing of generating next DETP_N, and therefore, STOUT_N (K) to (M) are generated at timings in the same line periods.

However, STOUT_N (K) to STOUT_N (M) are the signals having the same functions as one another, which makes it possible to share them in terms of timing. The write controllers 112K to 112M are independently provided corresponding to the respective colors of K, Y, C, and M in the block diagram of FIG. 5. If the write controllers 112K to 112M are configured as one block (single integrated circuit (IC)), functions of generating STOUT_N in the write controllers 112K to 112M overlap one another, which causes some of them to become unnecessary.

Therefore, as explained with reference to FIG. 6, the concept of the reference color for image formation is taken in, and the functions of generating the write-operation start signal (STOUT_N) with respect to the input of the operation start signal (STTRIG_N) are integrated into one. By causing the write-operation start signals (STOUT_N) to be provided as single in the write controllers 112K to 112M and causing the reference times to be provided as single in the write controllers 112K to 112M, unnecessary functions can be reduced.

When the color image forming apparatus 101 is used, all the image forming operations are not always a full-color operation including four-color image formation. For example, there are modes such as an image forming mode in which only K or M is used in the same manner as the conventional monochrome operation, and a two-color image forming mode in which only M and C are used.

When the image formation using only K is operated, there is no problem because the operation is performed with K as the reference color for image formation in the same manner as in FIG. 6. However, when the image formation using only M or using two colors of M and C but not using K is operated, K cannot be used as the reference color for image formation. That is because the image processor 115 may not transfer an image signal for a color that is not used for image formation to the write controllers 112K to 112M. Therefore, the write controllers 112K to 112M may sometimes turn off the laser diode for the color not used for image formation in order to prevent degradation in the laser diodes.

In this case, the laser diode for K that is the reference color for image formation upon the full-color operation is turned off during the operation of single-color image formation and two-color image formation. Therefore, DETP_N is not generated, which makes it impossible to generate STOUT_N with respect to the input of STTRIG_N. In such a case, the reference color for image formation may be changed from K to any desired color. In other words, a desired one of the write controllers 112K to 112M generates STOUT_N. By doing so, it is assumed that DETP_N (M) and DETP_N (C) are generated during two-color image formation of M and C. Therefore, the change of the reference color for image formation from K to C allows the write controller 112C to generate STOUT_N with respect to STTRIG_N. With this configuration, by operating the delay counters 116C and 116M for C and M using STOUT_N for generation of C as a reference, it is possible to realize adjustment of sub-scanning timing.

Figure 8:
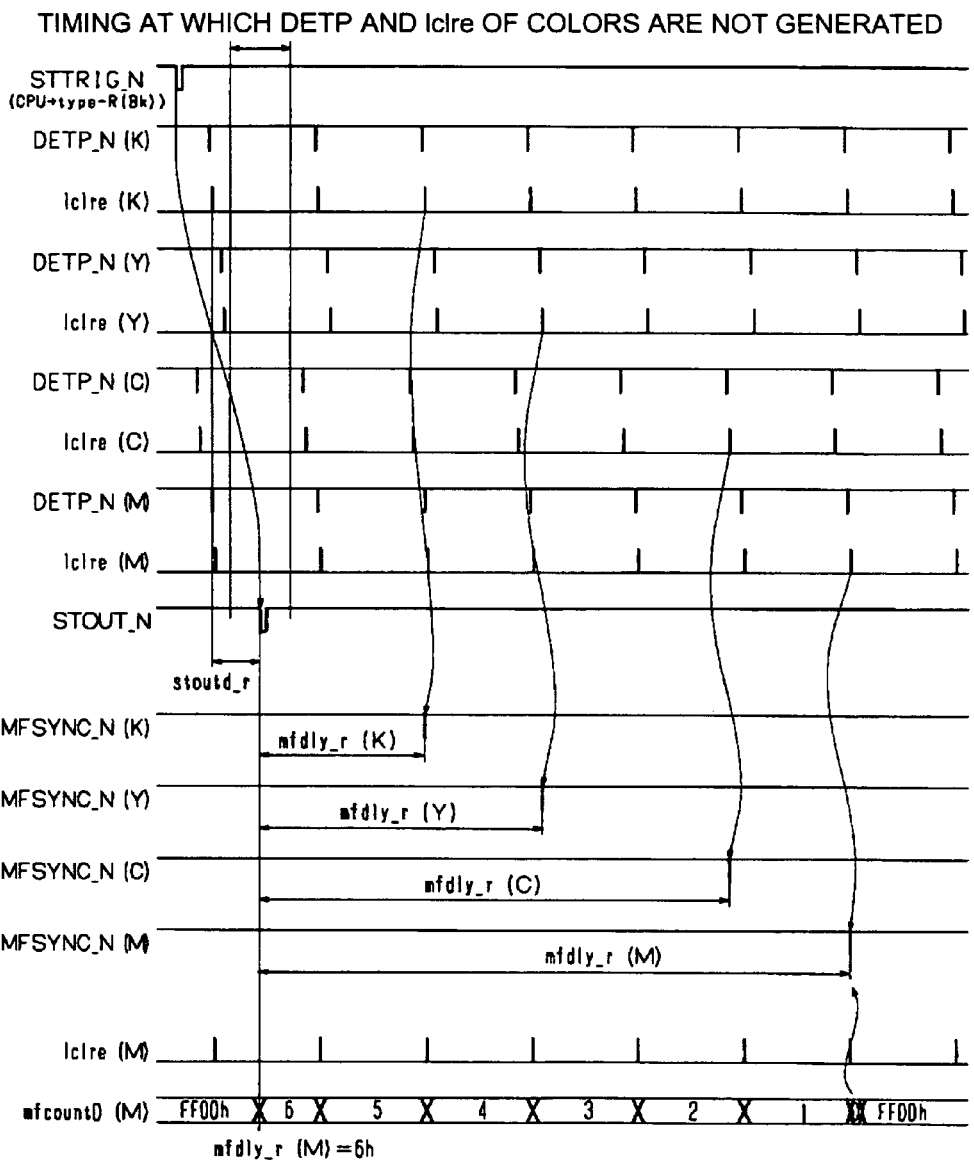
FIG. 8 is a timing chart of timing control in the sub-scanning direction.

FIG. 8 is a timing chart for explaining the function of controlling sub-scanning timing. The operation start signal (STTRIG_N) is input from the engine controller 111 to the write controllers 112K to 112M at the timing at which the registration sensor 113 detects a position of the sheet s. Any of the write controllers 112K to 112M in which a reference color for image formation is set generates the write-operation start signal (STOUT_N). The write controllers 112K to 112M adjust a delay amount in the sub-scanning direction from the timing of generating STOUT_N, and generate respective signals indicating image-signal transfer requests (MFSYNC_N).

FIG. 8 indicates an example of using a down-counter as a unit of adjusting the delay amount. In the example of FIG. 8, an initial value 6 is loaded as a number in the delay counter 0 (mfcount0(M)) of the delay counter 116M for M at the timing of generating STOUT_N. The initial value is a value of the number of delay lines (mfdly_r) in the sub-scanning direction that is previously calculated. The initial value mfdly_r is initially loaded as a value of mfcount0(M) at the timing of generating STOUT_N, and the value of mfcount0(M) is decremented by one for each input of the line synchronization signal lclre(M) for a corresponding color. MFSYNC_N(M) is output at the timing at which the counter value of mfcount0 (M) reaches 0. This allows control for the delay timing in the sub-scanning direction until generation of the signal (MFSYNC_N) for an image-signal transfer request to the image processor 115. The control can be performed using the write-operation start signal (STOUT_N) as a starting point even if the operation start signal (STTRIG_N) is asynchronously input to the write controllers 112K to 112M. By loading the initial value to the delay counter 3 using STOUT_N as a starting point and by performing down-count operation using a line synchronization signal in synchronization with rotation of the polygon mirror 20, it is possible to adjust positions for the sub-scanning registration.

If an adjustment value for the sub-scanning registration is to be changed during a print job operation, by controlling the delay counters zero to three using the down-counter, it is possible to change the adjustment value without concerning about the print job operation for a previous page before the change. The change is possible excluding a period from the timing of inputting the operation start signal (STTRIG_N) until the timing of loading initial values for the delay counters zero to three. Thus, it is possible to reflect the adjustment value for the sub-scanning registration in the print job in real time during the print job without decreasing productivity in printing operation.

Figure 9:
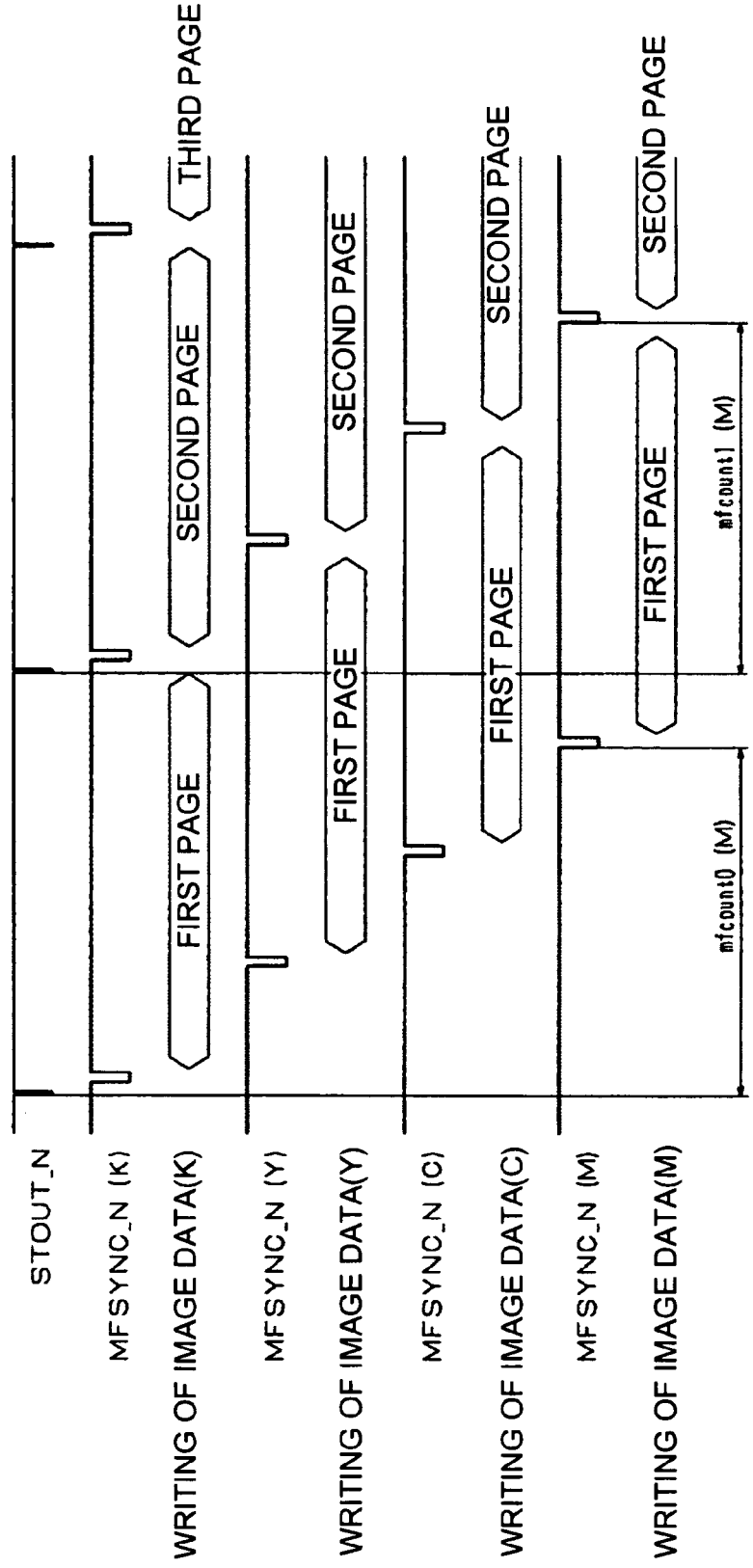
FIGS. 9 and 10 are timing charts of continuous image forming operations over a plurality of pages in the color image forming apparatus.
Figure 10:
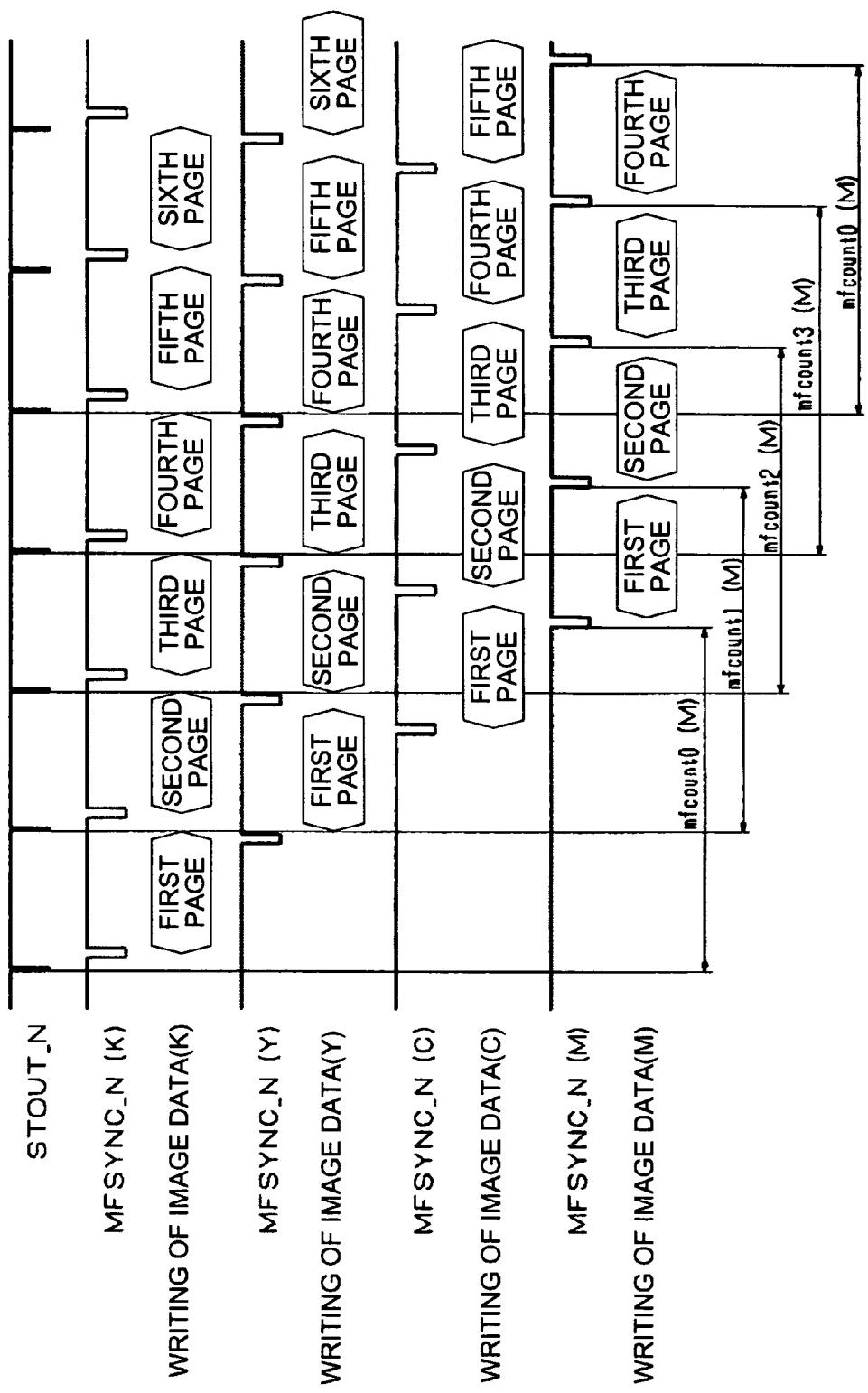

FIGS. 9 and 10 are timing charts of continuous image forming operations over a plurality of pages in the color image forming apparatus 101. During the operations over the pages, STTRIG_N is output from the engine controller 111 at a timing at which the registration sensor 113 detects a position of the sheet s for each of the pages. The write controller 112K generates the signal STOUT_N for K that is the reference color for image formation and outputs the signal to the write controllers 112K to 112M. After STOUT_N is input, the units select the delay counters zero to three in the delay counters 116K to 116M respectively, and control the delay lines in the sub-scanning direction. Each of the delay counters 116K to 116M has a plurality of counters (delay counters zero to three) for the colors (four colors in this example).

In the examples of FIGS. 9 and 10, the delay counter 0 (mfcount0) is selected for a first page. If the sheet s (e.g., A3: length size) that is lengthy in the sub-scanning direction as shown in FIG. 9 is used (the length of the sheet s in the sub-scanning direction is indicated by a strip-like hexagon in FIGS. 9 and 10), the write controller 112K for K as the first color does not generate STTRIG_N and STOUT_N for the second page after the write controller 112K makes an image-signal transfer request for the first page (output of MFSYNC_N(K)) and by the time the write controller 112M for M as the fourth color starts an image-signal transfer request (output of MFSYNC_N(M)). Therefore, the delay control over the sub-scanning timing is possible for the second page by the delay counter 0 (mfcount0) that is the same as that for the first page.

However, if the sheet s is shorter in the sub-scanning direction as shown in FIG. 10 (e.g., postcard: wide size), the write controller 112K for K finishes image formation for the first page after the write controller 112K makes an image-signal transfer request for the first page and by the time the write controller 112C for C as the third color makes an image-signal transfer request for the first page. Therefore, the write controller 112K for K as the first color can deal with the operation for the second page even if the job start signal for the second page is input. Referring to M as the fourth color, the write controller 112M does not yet make an image-signal transfer request for the first page. If there is only one delay control function (here, one delay counter in each of the delay counters 116K to 116M) for each of the colors in the sub-scanning direction, the write controller 112M for M as the fourth color is in a standby state for input of the operation start signal for the second page until the write controller 112M sends the image-signal transfer request for the first page (output of MFSYNC_N(M)). Therefore, by providing a plurality of delay control functions (the delay counters zero to three in each of the delay counters 116K to 116M) for each of the colors in the sub-scanning direction, it is possible to reduce a waiting time for the input.

Furthermore, by using the delay counters zero to three to be switched for each sheet s for the print job, the write controller 112K for K as the first color can receive a job-operation start signal for the second page and can start delay control over the sub-scanning line, during a period after the write controller 112K finishes the image formation and before the write controller 112M for M as the fourth color, which is final, makes an image-signal transfer request. Thus, it is possible to reduce the waiting time and efficiently perform the image formation over the pages.

As shown in FIG. 10, the write controller 112K generates STOUT_N for the third page by the time the write controller 112M for M as the fourth color sends an image-signal transfer request for the first page, which causes three-page images for the write controller 112M to be ready to be transferred. In the embodiment, each of the delay counters 116K to 116M includes the four delay counters zero to three (mfcount0 to 3), and therefore, each of the write controllers 112K to 112M can be ready to receive images for four pages at maximum. If the image forming operation is performed for the sheets s more than four pages, by switching the delay counters zero to three for each sheet s, it is possible to achieve a large amount of color image formation with high efficiency. The embodiment shows the example in which the four delay counters zero to three are provided in each of the delay counters 116K to 116M, but by providing two or more of delay timing control functions, it is also possible to achieve a large amount of color image formation.

Figure 11:
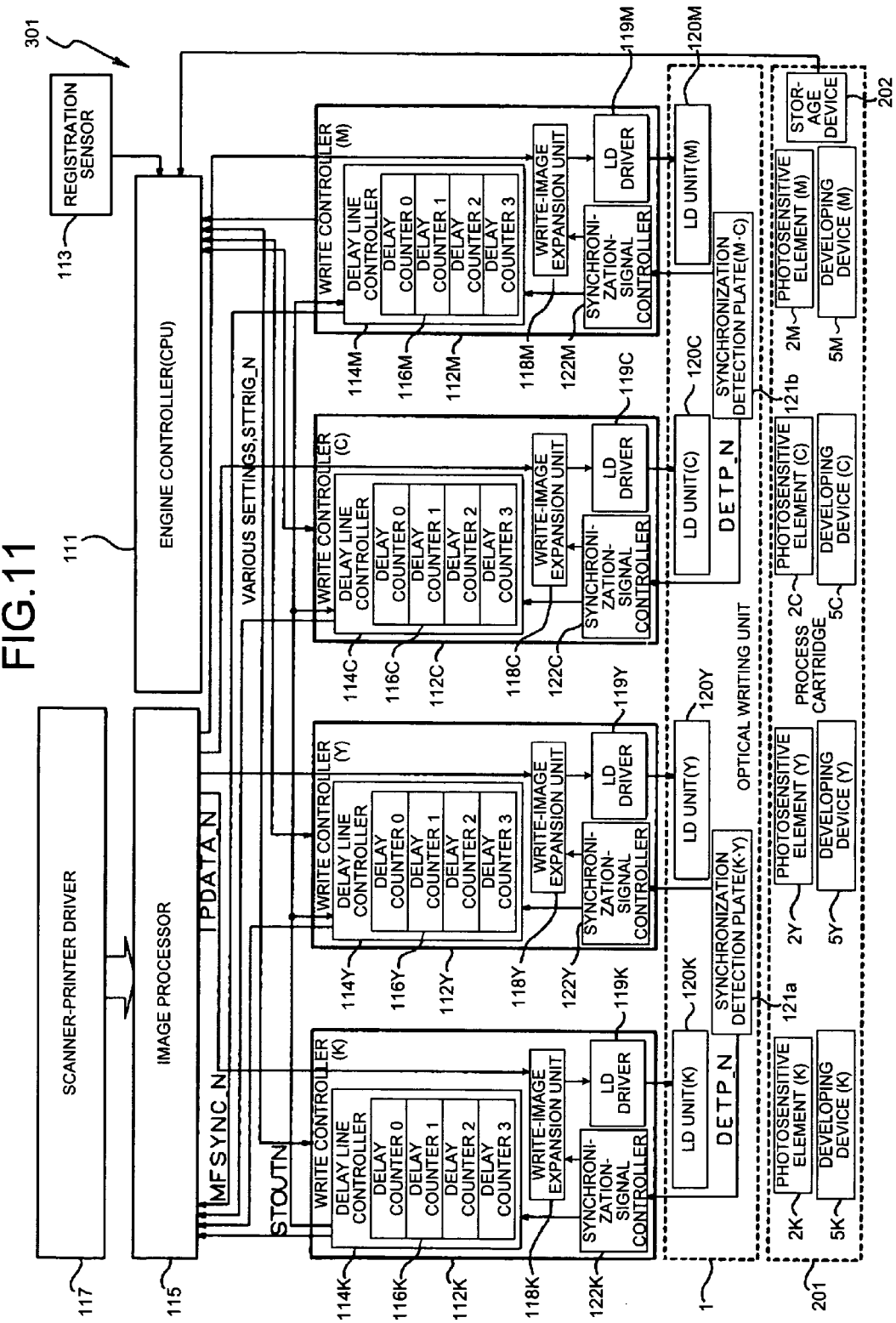
FIG. 11 is a block diagram of a control system for a color image forming apparatus according to another embodiment of the present invention.

FIG. 11 is a block diagram of a control system for a color image forming apparatus 301 according to another embodiment of the present invention. In the color image forming apparatus 301, the same reference numerals are assigned to the components corresponding to these of the color image forming apparatus 101 explained with reference to FIG. 1 and so on, and detailed explanation of the common technological contents is omitted.

The color image forming apparatus 301 has a different point from the color image forming apparatus 101 in that the color image forming apparatus 301 includes a process cartridge 201 as a part of the components thereof. The process cartridge 201 includes at least the photosensitive drums 2K to 2M and the developing devices 5K to 5M for the printer engines 102K to 102M. The photosensitive drums 2K to 2M for the colors and the like are integrated into one process cartridge 201 in the above manner, and the color image forming apparatus can be configured as a module.

A storage device 202 that includes Read Only Memory (ROM) is provided in the process cartridge 201. The storage device 202 stores a value as an initial load value to be set in the delay counters 116K to 116M or values used to calculate the value, i.e., distances from each exposure position of the photosensitive drums 2K to 2M up to each transfer position where each image is transferred to the intermediate transfer belt 3. By attaching the process cartridge 201 to the main body of the color image forming apparatus 301, the storage device 202 is readable by the engine controller 111. By adding a distance from a reference position of the sheet s as an output by the registration sensor 113 up to an image forming position for the first color, the number of delay lines in the sub-scanning direction for the first color in image formation can be easily calculated. The number of sub-scanning delay lines calculated in the above manner is used as an initial load value in the delay counters zero to three for the first color in image formation. And then, by finely adjusting the initial load value, a sub-scanning timing can easily be adjusted.

More specifically, in the color image forming apparatus 301 having the process cartridge 201 in which the photosensitive drums 2K to 2M and the developing devices 5K to 5M and the like are integrated into one unit, positional relationships for image formation as follows are known. That is, the positional relationship is between each of exposure positions where the respective photosensitive drums 2K to 2M are exposed with laser beams and each of transfer positions where an image is transferred to the sheet s. A difference between a first distance and a second distance, as explained below, corresponds to an adjusted delay amount in the sub-scanning timing up to sending an image-signal transfer request for the first color in image formation. The first distance is between the reference position for conveying the sheet s detected by the registration sensor 113 and the image forming position, and the second distance is between the exposure position and the transfer position. Therefore, by storing the delay amount in the process cartridge 201, it is possible to make clear each sub-scanning delay amount in individual process cartridges 201.

An adjusted delay amount for the sub-scanning timing is calculated by using the first distance and the second distance, which are stored in the individual process cartridges 201. And by using the adjusted delay amount calculated as an initial delay amount for controlling the sub-scanning timing, the position for the sub-scanning registration can be adjusted as default. This allows easy adjustment of the sub-scanning timing for the first color in image formation, as default, when the process cartridge 201 is replaced as one unit with another one.

Furthermore, if each arrangement interval between the photosensitive drums 2K to 2M is stored in a storage unit 202 of the process cartridge 201 in addition to the second distance, each interval between timings of image formation for each color can be easily determined. The engine controller 111 reads out the interval between the timings of image formation for each color from the intervals between the photosensitive drums 2K to 2M and from the second distance stored in the storage unit 202. And, a delay amount in timing for image formation is added to data for the interval read-out. The delay amount is obtained based on a period from the reference position for the sheet s, which is an output of the registration sensor 113, until the position of the first color for image formation. This allows the number of sub-scanning delay lines for each color to be easily calculated. Thus, by using the number of sub-scanning delay lines for each color as the initial load value set in the delay counters zero to three for each of the colors, and by performing fine adjustment through control over color registration, it is possible to easily adjust each sub-scanning registration for each of the colors.

The color image forming apparatus 301 is configured to transfer a color image formed on the intermediate transfer belt 3 to the sheet s, but a color image may be formed on the sheet 3 by carrying the sheet s on a belt corresponding to the intermediate transfer belt 3 towards the printer engines 102K to 102M where toner images are directly transferred from the respective photosensitive drums 2K to 2M in the printer engines 102K to 102M to the sheet s by being successively and superposedly transferred thereto.

According to the present invention, a reference time point of timing, at which each of the write controllers makes an image-signal transfer request, is set as a time point. The time point set is such that the synchronization detection signals for the whole colors, with respect to one main scanning after the operation start signal is input, are not longitudinally cut into two parts. Therefore, no displacement for one line period occurs between image formations for the colors, and no misregistration between the colors occurs at the position for the sub-scanning registration.

Furthermore, according to another aspect of the present invention, a timing of requesting a transfer of an image signal in individual process cartridges can be automatically set by mounting the process cartridge on the color image forming apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color image forming apparatus that forms a color image by superposing a plurality of toner images formed by a plurality of printer engines corresponding to respective colors, the color image forming apparatus comprising:

a plurality of light sources each of which emits light as image data to optically write an electrostatic latent image of a respective color on a photosensitive element provided in each of the printer engines;

a rotating polygon mirror that reflects the light from each of the light sources while rotating to expose and scan the photosensitive element;

a plurality of light receiving elements that receives the light reflected by the rotating polygon mirror and outputs a synchronization detection signal that becomes a reference for a start position of an optical writing in a main scanning direction with respect to the photosensitive element;

a plurality of write controllers that makes a transfer request for the image data from each of the light sources to control the optical writing performed by each of the light sources, wherein each of the write controllers performs the transfer request for the image data based on a time, as a reference time, at which the synchronization detection signals for whole colors in same main-scanning lines are included in either of a forward direction and a backward direction of the main-scanning lines, when an operation start signal that is asynchronous with the synchronization detection signal and becomes a start point of an imaging operation is input; and a counter that counts a delay time from the reference time to a time when the transfer request for the image data is made, wherein a plurality of counters are provided for each of the colors, a number of counters being the same as a number of printer engines of the plurality of printer engines, and the counters are switched for each printing medium of a plurality of printing medium, and wherein when the image is formed continuously on each of the plurality of printing medium, one of the counters for each of the colors is selected to count a delay time for a current printing medium, and wherein for a subsequent printing medium, the counter used for each of the colors is a different one of said counters which corresponds to the color other than a most recently used counter for the color.

2. The color image forming apparatus according to claim 1, wherein the reference time is singular for the write controllers.

3. The color image forming apparatus according to claim 2, wherein a write controller that controls a single reference time can be arbitrarily selected from among the write controllers.

4. The color image forming apparatus according to claim 1, wherein each of the write controllers has different reference times.

5. The color image forming apparatus according to claim 1, wherein the counter is a down-counter.

6. The color image forming apparatus according to claim 5, further comprising a loading unit that loads a start load value at a timing at which the synchronization detection signals for a surface scanning of the whole colors of the rotating polygon mirror are not detected after inputting the operation start signal to the down-counter.

7. The color image forming apparatus according to claim 5, wherein the down-counter decrements according to the synchronization detection signal for each of the colors.

* * * * *